United States Patent [19]

Olofsson

[11] 4,313,396
[45] Feb. 2, 1982

[54] MILKING PLANT

[75] Inventor: Hans K. Olofsson, Huddinge, Sweden

[73] Assignee: Alfa-Laval AB, Tumba, Sweden

[21] Appl. No.: 151,802

[22] Filed: May 21, 1980

[30] Foreign Application Priority Data

May 25, 1979 [SE] Sweden ................... 7904586

[51] Int. Cl.³ .............................................. A01J 5/04
[52] U.S. Cl. ................................................ 119/14.44
[58] Field of Search .............. 119/14.02, 14.08, 14.41, 119/14.44, 14.14, 14.17, 14.42; 417/87; 137/205

[56] References Cited

U.S. PATENT DOCUMENTS 3,373,720  3/1968  Duncan ............................ 119/14.02
3,435,841  4/1969  Williams et al. ................... 137/205
3,783,837  1/1974  Olander ............................ 119/14.08

Primary Examiner—Hugh R. Chamblee
Attorney, Agent, or Firm—Cyrus S. Hapgood

[57] ABSTRACT

A milking plant of the kind operating at two different vacuum levels is provided with a vacuum source producing a low vacuum, and an ejector connected to the vacuum source and producing a high vacuum.

4 Claims, 3 Drawing Figures

MILKING PLANT

BACKGROUND

The present invention relates to a milking plant of the kind operating with at least two different vacuum levels.

In milking plants of this kind, vacuum is usually provided by a vacuum pump which produces a high vacuum, and a reduction valve which reduces the vacuum level to a suitable low vacuum when required. The drawback of this arrangement is that a relatively large vacuum pump is required since the pump constantly works against high vacuum and the capacity of a vacuum pump is reduced with increasing vacuum. This results in a relatively large energy consumption and also a high operating temperature of the vacuum pump.

It is also known to provide the plant with two separate vacuum systems, one for high vacuum and one for low vacuum, each being provided with a vacuum pump. In this case no reduction valve is required since the vacuum pumps directly deliver vacuum of the respective desired level. However, the arrangement will be relatively expensive since two vacuum pumps with appurtenant motors are required.

BRIEF DESCRIPTION

The object of the invention is to provide a milking plant in which the above described disadvantages of previously known arrangements have been eliminated or at least reduced considerably. This has been obtained by means of a milking plant which, according to the invention, is characterized in that it comprises a vacuum source for producing vacuum of a low level, and an ejector connected to the vacuum source and arranged to generate a vacuum of a higher level.

The invention provides a simple and economical solution to the vacuum supply problem in milking plants operating with two different vacuum levels. Since the vacuum pump needs deliver only low vacuum, its operating temperature will be lower. It is true that the ejector has a lower efficiency than a vacuum pump, but since the consumption of high vacuum is only a small portion of the whole vacuum consumption, an improvement of the efficiency of the vacuum supply system is still obtained in comparison with a conventional system comprising a high vacuum pump and a reduction valve.

DRAWINGS

The invention will be described in more detail below with reference to the accompanying drawings on which:

FIGS. 1 and 2 are diagrammatical perspective views of two embodiments of the milking plant according to the invention, and FIG. 3 is a longitudinal section of an ejector.

DESCRIPTION OF PREFERRED EMBODIMENTS

Figure 1:
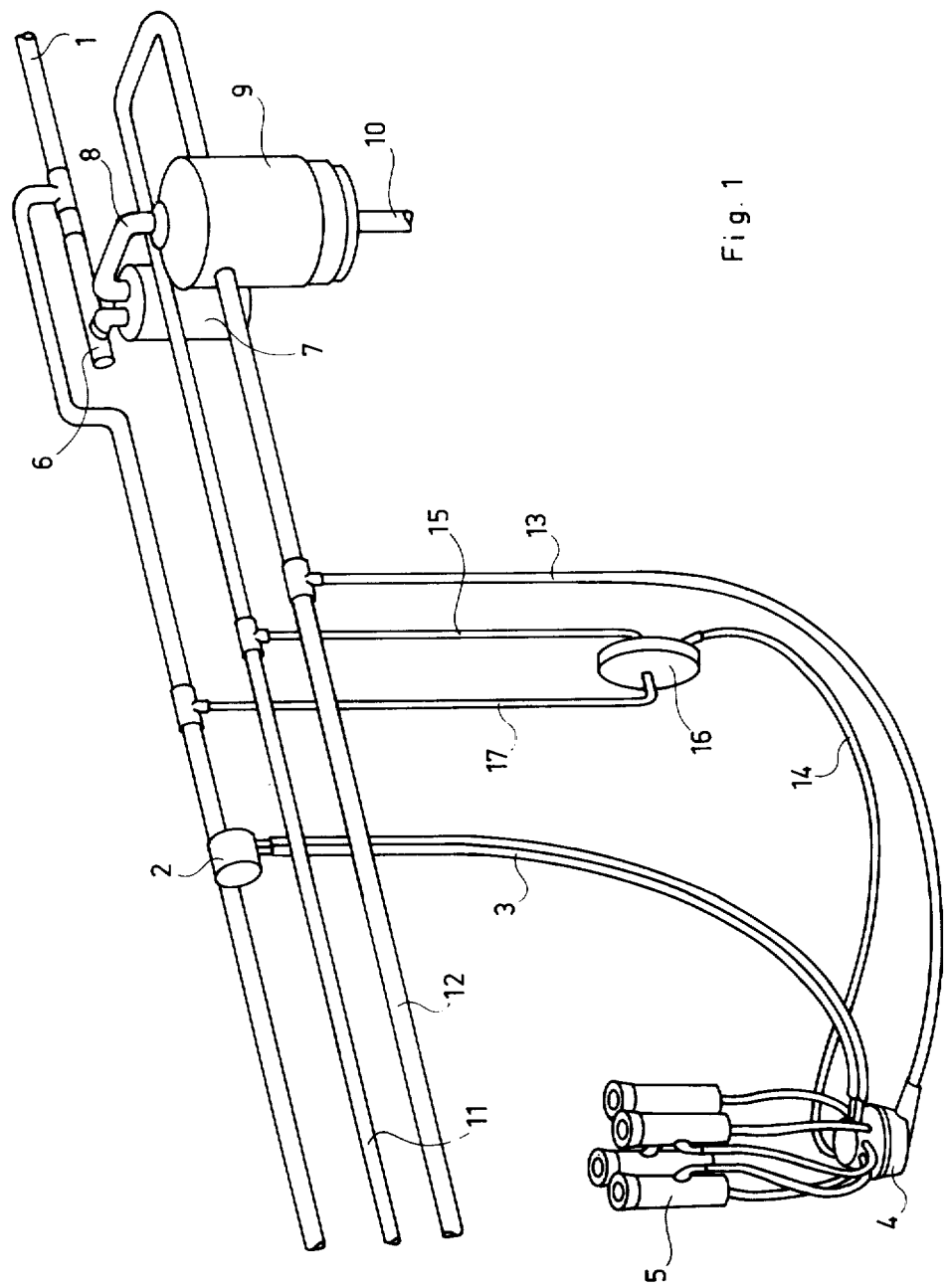

The milking plant shown in FIG. 1 comprises a pipeline 1 connected to a vacuum pump (not shown) which delivers a low vacuum of e.g. 50 kPa. The pipeline 1 has a pulsator 2 connected thereto which, via hoses 3, is connected to a milk claw 4 with a cluster of teat cups 5. An ejector 6 is furthermore connected to the pipeline 1, said ejector being connected via a so-called sanitary trap 7 and a pipeline 8 to a milk receiver jar 9. The jar 9 is provided with a milk outlet 10 connected to a storage tank (not shown) and is further connected to a vacuum line 11 and a milk line 12.

The milk claw 4 is connected to the lines 11 and 12 on the one hand via a milk hose 13 and on the other hand via vacuum hoses 14, 15 and a vacuum stabilizing valve 16. The valve 16 is also connected to the vacuum line 1 via a hose 17.

The line 1 contains low vacuum of e.g. 50 kPa which is generated by the vacuum pump (not shown). By means of the ejector 6, the vacuum level is raised to e.g. 65 kPa and this higher vacuum is thus conveyed to the lines 11 and 12. In the valve 16, which has a design well known to those skilled in the art, the high vacuum is reduced to the lower level of 50 kPa appropriate for milking and to this end the low vacuum supplied via the hose 17 is used as control vacuum. Milk is conveyed from the milk claw 4 by means of high vacuum via the hose 13 and the line 12 to the jar 9 and is pumped therefrom by a pump which is not shown. The milk claw is provided in a known manner with a float-controlled valve which prevents air from escaping via the milk hose 13.

Figure 2:
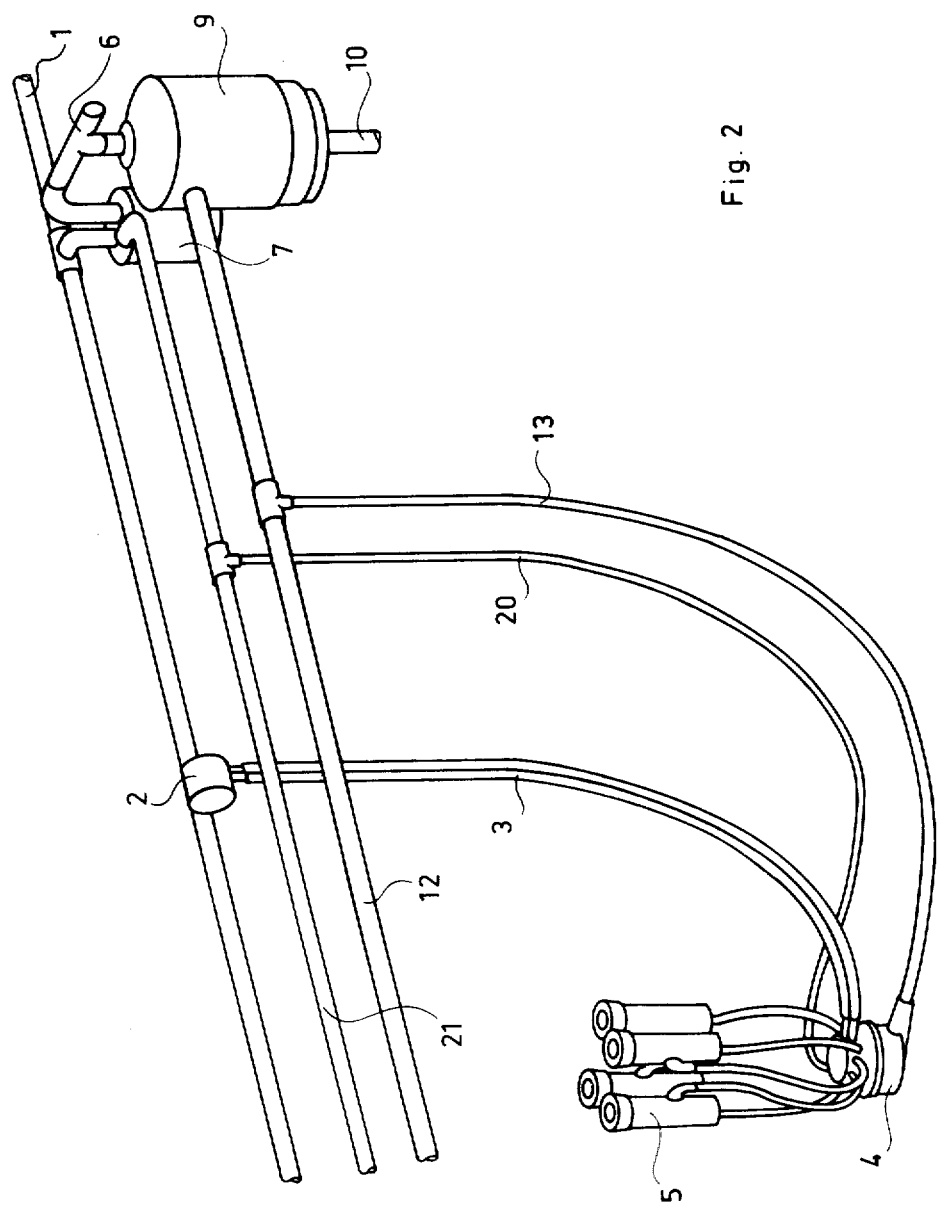

FIG. 2 illustrates another embodiment of the plant described with reference to FIG. 1, the same reference numerals being used for corresponding elements. In this embodiment, the claw 4 is connected by means of a vacuum hose 20 to a low vacuum line 21 which in turn is connected to the sanitary trap 7.

The ejector 6 is interconnected between the sanitary trap 7 and the jar 9 and generates high vacuum for the milk transport from the claw 4 to the jar 9. Since high vacuum is supplied to the line 12 only the consumption of high vacuum is considerably lower in this case than in the embodiment according to FIG. 1, and consequently, an ejector having a corresponding lower capacity can be used.

Figure 3:
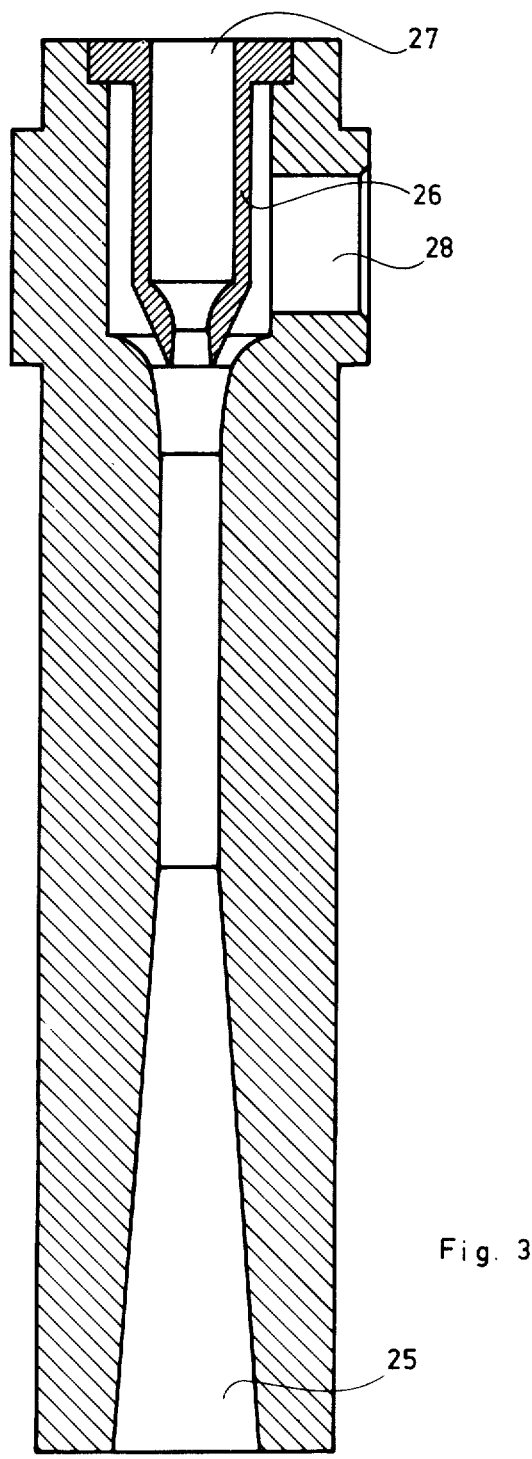

The ejector shown on a larger scale in FIG. 3 comprises a generally cylindrical body which at one end has an air outlet 25 for connection to a vacuum source. An inlet nozzle 26 having an air inlet 27 connected to the atmosphere, and a radially directed high vacuum connection 28 are provided at the opposite end. By connecting the outlet to a vacuum pump producing a low vacuum, e.g. 50 kPa, a higher vacuum, e.g. 65 kPa, may be provided at the high vacuum connection 28.

I claim:

1. In a milking system, the combination of a cluster of teat cups, a first pipe line, means operatively connecting said first pipe line to the cluster for pulsating the teats, a second pipe line, means operatively connecting said second pipe line to the cluster to receive milk therefrom, a vacuum source connected to said first pipe line for producing a low vacuum therein, an ejector leading from said first pipe line, and means through which the ejector communicates with the second pipe line to maintain in said second line a vacuum higher than said low vacuum.

2. The combination of claim 1, in which said connecting means include a milk claw communicating with the teat cups to receive milk therefrom, the combination comprising also a third pipe line communicating with said first line to provide a low vacuum in said third line, and means connecting said third line to the interior of the claw to maintain a low vacuum therein.

3. The combination of claim 1, in which said connecting means include a milk claw communicating with the teat cups to receive milk therefrom, the combination comprising also a third pipe line communicating with said second line to provide a high vacuum in the third line, and a vacuum stabilizing valve connecting said third line to the interior of the claw to maintain therein a vacuum lower than said high vacuum.

4. The combination of claim 3, in which the stabilizing valve is also connected to said first pipe line to provide said low vacuum as a control vacuum.

* * * * *